J. G. HENDERSON.
Bucket for Chain-Pumps.
No. 161,881.  Patented April 13, 1875.
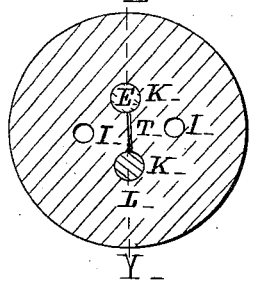
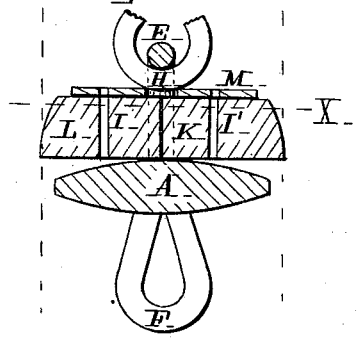

UNITED STATES PATENT OFFICE.

JOHN G. HENDERSON, OF KEOKUK, IOWA.

IMPROVEMENT IN BUCKETS FOR CHAIN-PUMPS.

Specification forming part of Letters Patent No. 161,881, dated April 13, 1875; application filed February 6, 1875.

*To all whom it may concern:*

Be it known that I, JOHN G. HENDERSON, of Keokuk, Lee county, Iowa, have invented an Improvement in Chain-Pumps, of which the following is a specification:

This invention consists in the construction and application of an elastic sucker to the ordinary buckets of chain-pumps. This is made and applied substantially as set forth hereinafter, referring to the accompanying drawings, in which—

Figure I is a horizontal section of the improved pump-bucket on line X, Fig. II; and Fig. II is a vertical section of same on line Y.

I use the ordinary pump-chain, with bucket A, having link-loops E F above and below. The chain-link H is removed, and the rubber sucker L is put onto the upper loop E, as shown, and the link H is put into place again. The rubber L is made of circular form, with flat or other formed bottom and top—largest at the bottom, like the part of a cone. It has four holes, I I' K, from top to bottom, in a sort of quadrangle; and it is cut across from one of them, K, to another through the center without removing any of the material. The loop E is pressed through this cut, and, with its side stems, into the holes K at the ends of the cut. The cut then closes together under the top of the loop E, and holds the parts firmly together. The link H passes through the loop E above, and prevents removal. The washer M, below the link H, is used, if required. This has a slot fitting over loop E, and holes corresponding with holes I I'. The rubber is large enough to fit the pump-tube tightly as it is drawn through. When drawn up with water it bends downward at the sides so the holes I I' are closed over the upper face of the bucket A, so no water can pass. This makes the pump tight during operation. When the pump stops, the rubber straightens up from the rounded face of bucket A, as shown in drawings, and lets the water leak through the holes I', to prevent freezing or standing in tube. This is gained without loss of water in pumping. The chain is supplied with three or more of these suckers, so there will be always one in the tube.

I claim—

1. The elastic sucker L, with holes connected by a cut, T, so arranged as to pass over and close up on link E, substantially as set forth.

2. The elastic sucker L, with opening I, in combination with lower disk A, arranged so that the opening will be closed when in operation, and open when stationary, substantially as set forth.

JOHN G. HENDERSON.

Witnesses:
SAML. J. WALLACE,
M. R. KING.